(12) United States Patent
Hung et al.

(10) Patent No.: US 6,370,361 B1
(45) Date of Patent: Apr. 9, 2002

(54) TRANSCEIVER WITH A RECEIVE/TRANSMIT FAST SWITCH FUNCTION

(75) Inventors: Tsung-Yang Hung, Ping-Tong Hsien; Min-Hung Shen, Hsinchu Hsien, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/246,319

(22) Filed: Feb. 8, 1999

(30) Foreign Application Priority Data

Oct. 9, 1998 (TW) ........................................ 87116815 A

(51) Int. Cl.[7] ................................................ H04B 1/40
(52) U.S. Cl. ........................... 455/83; 455/76; 455/260; 455/84
(58) Field of Search ............................ 455/83, 75, 76, 455/255, 256, 257, 258, 259, 260, 313, 84, 86, 87, 118

(56) References Cited

U.S. PATENT DOCUMENTS

| | | | | | |
|---|---|---|---|---|---|
| 4,027,242 A | * | 5/1977 | Yamanaka | .................... | 455/76 |
| 5,465,409 A | * | 11/1995 | Borras et al. | ................ | 455/260 |
| 5,511,236 A | * | 4/1996 | Umstattd et al. | .............. | 455/76 |
| 5,519,885 A | * | 5/1996 | Vaisanen | ..................... | 455/76 |
| 5,603,097 A | * | 2/1997 | Kanou | .......................... | 455/76 |
| 5,603,099 A | * | 2/1997 | Watanabe | .................... | 455/260 |
| 5,657,344 A | * | 8/1997 | Na | ............................... | 455/76 |
| 5,734,970 A | * | 3/1998 | Saito | ........................... | 455/76 |
| 5,890,051 A | * | 3/1999 | Schlang et al. | ................ | 455/76 |
| 5,898,906 A | * | 4/1999 | Williams | ....................... | 455/75 |
| 5,987,309 A | * | 11/1999 | Adachi et al. | .................. | 455/86 |
| 6,002,920 A | * | 12/1999 | Consolazio et al. | ........... | 455/83 |
| 6,009,312 A | * | 12/1999 | Dolman | .......................... | 455/76 |
| 6,034,573 A | * | 3/2000 | Alberton | ....................... | 455/75 |
| 6,061,575 A | * | 5/2000 | Lombardi | ..................... | 455/76 |
| 6,201,952 B1 | * | 3/2001 | Shimizu et al. | .............. | 455/314 |

FOREIGN PATENT DOCUMENTS

| | | | | | |
|---|---|---|---|---|---|
| GB | 2 279 519 | * | 1/1995 | ............ | H04B/1/40 |
| WO | 98/31094 | * | 7/1998 | ............ | H03D/7/16 |

* cited by examiner

Primary Examiner—William Trost
Assistant Examiner—Rafael Perez-Gutierrez
(74) Attorney, Agent, or Firm—Thomas, Kayden, Horstemeyer & Risley

(57) ABSTRACT

A transceiver with a receive/transmit fast switch function according to the invention is disclosed. In the transceiver, a frequency generator is used to generate a carrier signal which is fed into a transmitter and a receiver. Furthermore, a frequency transfer circuit and a frequency synthesizer are used to generate first, second and third local oscillation signals which are fed into the transmitter and the receiver. When transmitting a signal, the transmitter receives the carrier signal and the first local oscillation signal. The carrier signal is up converted by a mixer and then transmitted by the antenna. Inversely, when receiving a signal, the receiver receives the signal from the antenna, the receive signal is down converted in coordination with the second and third local oscillation signals and then outputted. Moreover, the receive signal can be demodulated into an FSK signal by a discriminator.

16 Claims, 3 Drawing Sheets

TRANSCEIVER WITH A RECEIVE/TRANSMIT FAST SWITCH FUNCTION

CROSS-REFERENCE TO RELATED APPLICATION

This application claims the priority benefit of Taiwan application serial no. 87116815, filed Oct. 09, 1998, the full disclosure of which is incorporated herein by reference.

BACKGROUND OF THE INVENTION

1. Field of the Invention

The invention relates to a transceiver, and in particular to a transceiver which has a function of fast switch between receive and transmit implemented by using different frequencies of intermediate frequency (IF) signals.

2. Description of the Prior Art

Today, communication technology, especially in radio communication systems, such as cellular phones and satellite communication, has been widely and swiftly developed and used. Generally, in low-tier personal digital communication systems, variety of modulation schemes can be grouped into IQ modulation systems and non-IQ modulation systems. The way for multiplex includes a time-division duplex (TDD) and a frequency-division duplex (FDD). In generally, to implement GFSK, modulation schemes are classified into Quadrature Modulation and Direct VCO Modulation. In the invention, GFSK modulation schemes applied in the non-IQ modulation system is adopted.

Typically, an IF block used for processing modulation & demodulation signals is included in chip sets in a personal communication system. In the transmission path, the IF block can convert a digital input signal to an analog modulated output signal that serves as an intermediate frequency input signal. In the Rx path, the IF block can also down convert and demodulate a receive signal into a baseband signal. Next, a conventional transceiver will be provided for description.

Referring to FIG. 1, a circuit block diagram of a conventional transceiver 14a is shown. The conventional transceiver 14a includes a receiver 102, a transmitter 104a, a band pass filter 106 and a receive/transmit switch 108. The receiver 102 includes a Mixer & IF AMP 110 and a discriminator 112. The transmitter 104a includes a phase-lock-loop (PLL) 114, a transmit signal switch 116 and a power amplifier 118.

As to a receiving operation thereof, a modulated receive signal 20a received from an antenna 12 is filtered by the band pass filter 106 and then delivered to the receive/transmit switch 108. According to a receive/transmit control signal 30f, the receive/transmit switch 108 feeds the filtered and modulated receive signal 122 into the Mixer & IF AMP 110. At this time, according to an enable/disable signal 30a, the Mixer & IF AMP 110 can down convert the receive signal 122 to a Rx IF signal 126 in coordination with a local oscillation signal 124. The discriminator 112 receives the Rx IF signal 126, and then generates a demodulated receive signal 22a.

In TDD mode, the Mixer & IF AMP 110 of the receiver 102 and the discriminator 112 can receive the enable/disable signal 30a for enabling/disabling.

Similarly, the transmitter 104a receives enable/disable signals 30b, 30c and 30d. The phase-lock-loop 114 can receive a PLL enable/disable signal 30b to enable all active devices. The phase-lock-loop 114 can receive a VCO enable/disable signal 30c to enable/disable a voltage-controlled oscillator (VCO). The power amplifier 118 can be enabled/disabled according to an enable/disable signal 30d.

The phase-lock-loop 114 included in the transmitter 104a is used to generate a radio frequency signal 130. According to the receive/transmit control signal 30f, a required radio frequency signal 130 is selected by the transmit signal switch 116. When the transceiver 14a is at a transmit mode, a radio frequency signal 132 output from the transmit signal switch 116 is fed into the power amplifier 118, and then amplified. Afterwards, the amplified radio frequency signal 134 is fed into the receive/transmit switch 108. According to the receive/transmit control signal 30f, the radio frequency signal 134 is filtered by the filter 106, and then transmitted from the antenna 12.

On the contrary, when the transceiver 14a is at a receive mode, a radio frequency signal 130 generated by the phase-lock-loop 114 is selected to serve as the local oscillation signal 124 of the receiver 102 by the transmit signal switch 116, and then fed into the Mixer & IF AMP 110 of the receiver 102.

As described above, the transmitter 104a and receiver 102 of the transceiver use the same intermediate frequency signal. Therefore, under a transmit mode, it is necessary to perform an open loop operation for preventing distortions caused to the modulated signal by the phase-lock-loop. Furthermore, the time for the open loop modulation system to reach a stable state cannot keep longer, leading to influence to data transmission amount. As a result, a system reaction delay is usually created to lower data transmission amount.

SUMMARY OF THE INVENTION

In view of the above, an object of the invention is to provide a transceiver with a receive/transmit fast switch function which can efficiently prevent interference caused during a signal receive/transmit operation by using different receive/transmit intermediate frequency signals. Additionally, the transceiver of the invention can also eliminate data distortion, lengthen transmission slot and decrease the stand-by time for receive/transmit switches.

The operation of the transceiver with a receive/transmit fast switch function according to the invention will be briefly described hereinafter.

Under a transmit mode, a carrier signal is generated and modulated by a frequency generator, and then fed into a transmitter. Inversely, under a receive mode, a frequency-fixed carrier signal is generated by the frequency generator. Moreover, a first intermediate frequency signal and a second intermediate frequency signal are generated by an intermediate frequency circuit, and then fed into the transmitter and the receiver to serve as local oscillation signals. When transmitting a signal, the modulated carrier signal and the first intermediate frequency signal are received by the transmitter. Then, the modulated carrier signal is up converted by a mixer, and then outputted. Oppositely, when receiving a signal, the receive signal is down converted by a mixer in coordination with the second intermediate frequency signal and the carrier signal, and then outputted. Finally, the receive signal is demodulated into an FSK signal by a discriminator. The transceiver frequency synthesizer is no longer re-set or changed into any frequency between Tx/Rx mode except that a new RF channel is allocated.

BRIEF DESCRIPTION OF THE DRAWINGS

The invention will be more fully understood from the detailed description given hereinbelow and the accompanying drawings which are given by way of illustration only, and thus do not limit the present invention, and wherein.

DETAILED DESCRIPTION OF THE PREFERRED EMBODIMENTS

Figure 1:
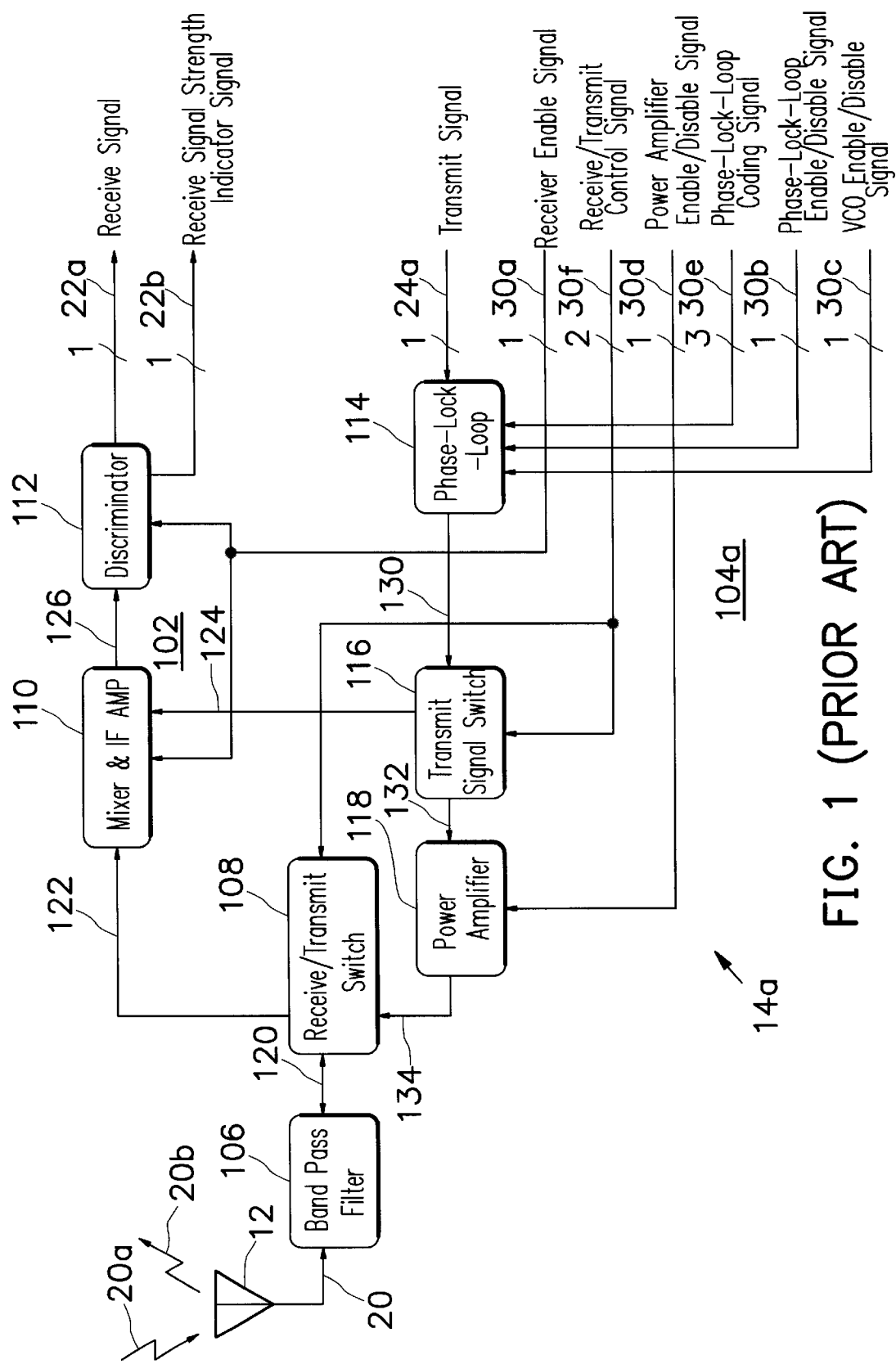
FIG. 1 is a circuit block diagram showing a conventional transceiver.
Figure 2:
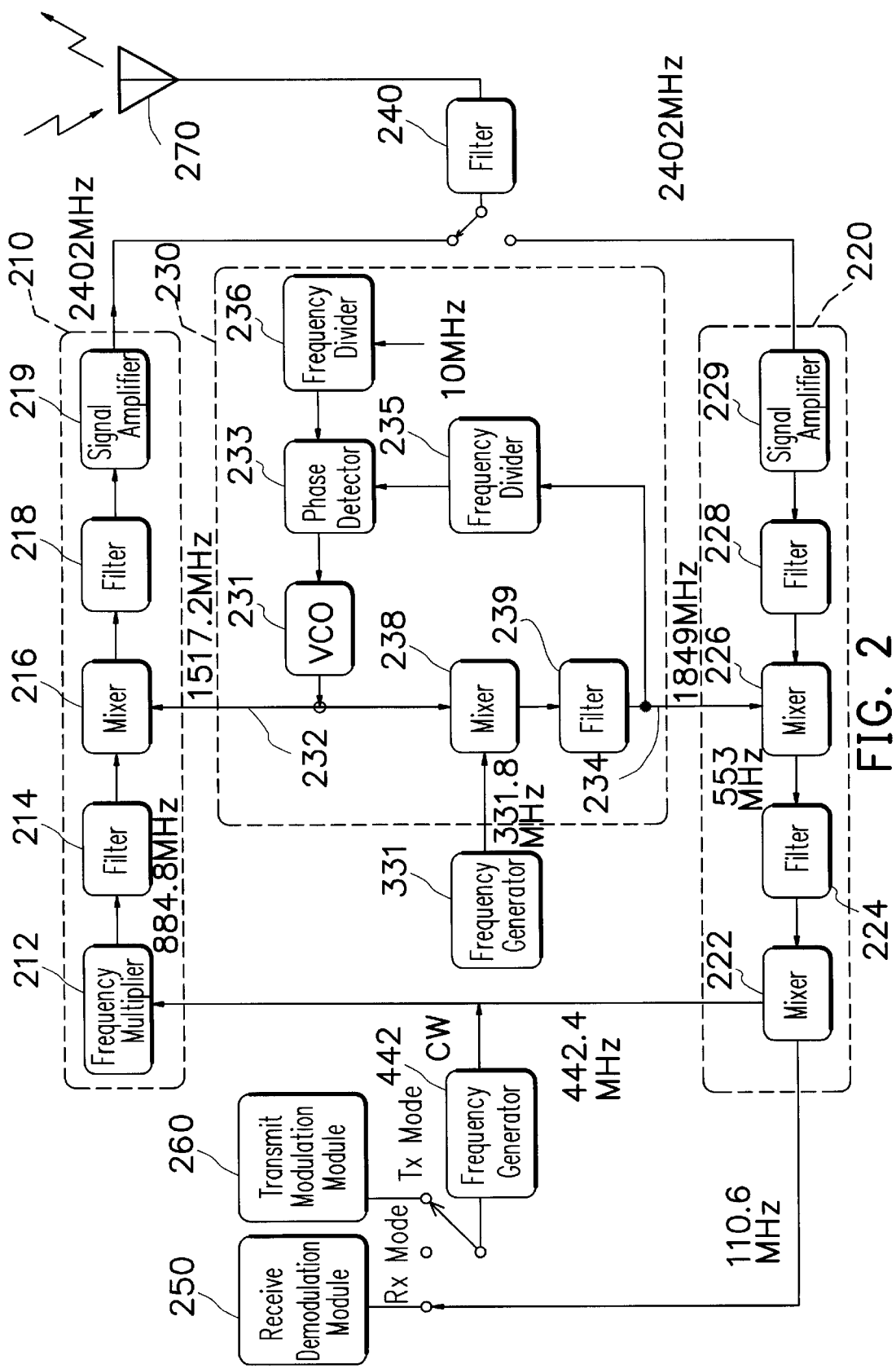
FIG. 2 is a circuit block diagram showing a transceiver with a receive/transmit fast switch function according to a preferred embodiment of the invention.

FIG. 2 is a circuit block diagram showing a transceiver with a receive/transmit fast switch function according to a preferred embodiment of the invention.

Basically, the transceiver includes a transmitter 210, a receiver 220 and an intermediate frequency circuit 230. The intermediate circuit 230 can generate two intermediate frequency signals 232 and 234 with different frequencies, such as 1,517.2 MHz and 1,849 MHz, according to a frequency-fixed carrier, serving local oscillation signals of the transmitter 210 and the receiver 220. The transmitter 210 and the receiver 220 using different frequencies of intermediate frequency signals is the main feature of the invention. The operation of the transceiver in accordance with the invention will be described hereinafter.

Referring to FIG. 2, a frequency generator 442 is electrically coupled to either a receive demodulation module 250 or a transmit modulation module 260 according to a signal receive/transmit mode. Under a transmit mode, a carrier signal modulated by frequency shift keying (FSK) is generated and then fed into a frequency multiplier 212 by the frequency generator 442 electrically coupled to the transmit modulation module 260. The modulated carrier signal is received and multiplied by the frequency multiplier 212. For example, the frequency of the modulated carrier signal is doubled to 884.8 MHz. The multiplied carrier signal is received and filtered and then fed into a mixer 216 by a filter 214. The carrier signal is up converted to have a frequency of 2,402 MHz by the mixer 216 in coordination with an intermediate frequency signal 232. Thereafter, the up converted carrier signal is fed into a filter 218 for filtering. Next, the filtered carrier signal is received and amplified by a signal amplifier 219. The amplified carrier signal is fed into a filter 240 for filtering and then transmitted from an antenna 270.

Under a receive mode, a signal amplifier 229 receives and amplifies a receive signal fed into the antenna 270 and passing through the filter 240. The receive signal can be a modulated carrier signal with a frequency of 2,402 MHz. A filter 228 filters the amplified receive signal fed in from the signal amplifier 229. A mixer 226 down converts the filtered receive signal fed in from the filter 228 to a first received intermediate signal with a frequency of 553 MHz in coordination with an intermediate frequency signal 234. A filter 224 filters the down converted receive signal output from the mixer 226. A mixer 222 down converts the frequency of the filtered receive signal coming from the filter 224 to 110.6 MHz. A discriminator can be used to demodulate the down converted carrier signal with a frequency of 110.6 MHz into an FSK signal. It is noted that the carrier signal not modulated output from the frequency generator 442 at a receive mode is different from the modulated carrier signal generated by the frequency generator 442 at a transmit mode.

Additionally, the intermediate frequency circuit 230 receives a frequency-fixed carrier signal with, for example, a frequency of 331.8 MHz, from a frequency generator 331 and generates two intermediate frequency signals 232 and 234 with different frequencies. Practically, a voltage-controlled oscillator (VCO) 231 is used to generate the intermediate frequency signal 232. The mixer 216 and a mixer 238 receive the intermediate frequency signal 232 fed in from the voltage-controlled oscillator 231. The mixer 238 receives the intermediate frequency signal 232 and the frequency-fixed carrier signal then to generate the intermediate frequency signal 234. A filter 239 receives and filters the intermediate frequency signal 234 fed in from the mixer 238, then output to the mixer 226. Furthermore, a frequency divider 236 receives and divides a fundamental frequency signal with a frequency of 10 MHz, then fed into a phase detector 233. A frequency divider 235 receives and divides the intermediate frequency signal 234, then fed into the phase detector 233. Subsequently, the phase detector 233 compares the divided fundamental frequency and intermediate frequency signals to each other so as to generate a detecting signal. The voltage-controlled oscillator 231 receives the detecting signal thereby to generate the intermediate frequency signal 232.

Figure 3:
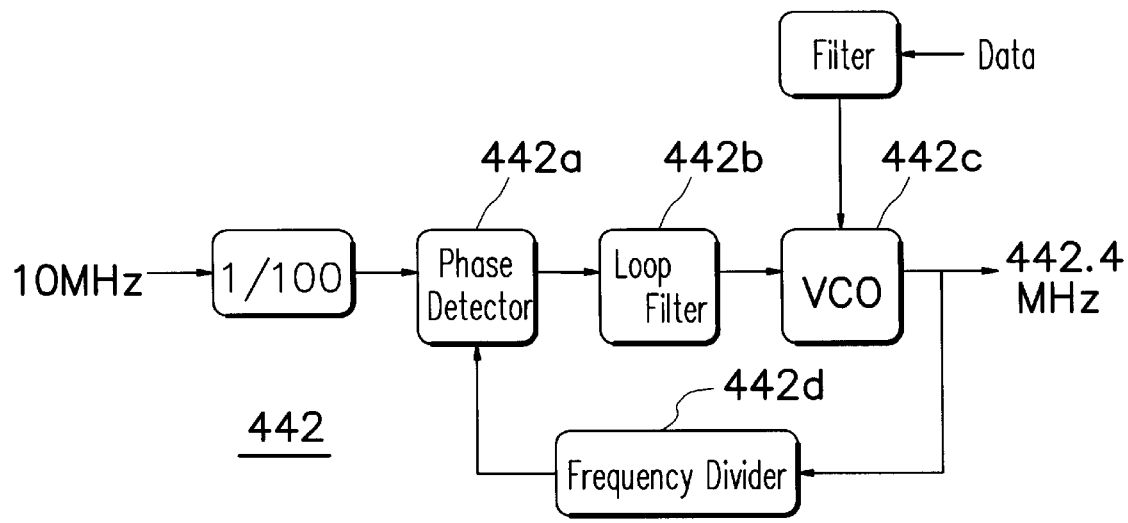
FIGS. 3 and 4 are circuit block diagrams showing the frequency generators of FIG. 2, respectively.

FIG. 3 is a circuit block diagram showing the frequency generator 442 of FIG. 2 with a phase-lock-loop structure. As shown in FIG. 3, a 10 MHz fundamental frequency signal is divided and fed into a phase detector 442a. A 442.4 MHz carrier signal is divided by a frequency divider 442d and then fed into the phase detector 442a. The phase detector 442a compares the two divided signals to each other and then generates a detecting signal. A loop filter 442b filters the detecting signal fed in from the phase detector 442a into a DC voltage signal.

A voltage-controlled oscillator 442c receives the DC voltage signal thereby to generate the 442.4 MHz carrier signal. It is noted that a required data signal is fed into the voltage-controlled oscillator 442c by gaussian frequency shift key (GFSK) for modulating the carrier signal. Under a receive mode, the frequency generator generates a carrier signal with a fixed frequency without modulation.

Figure 4:
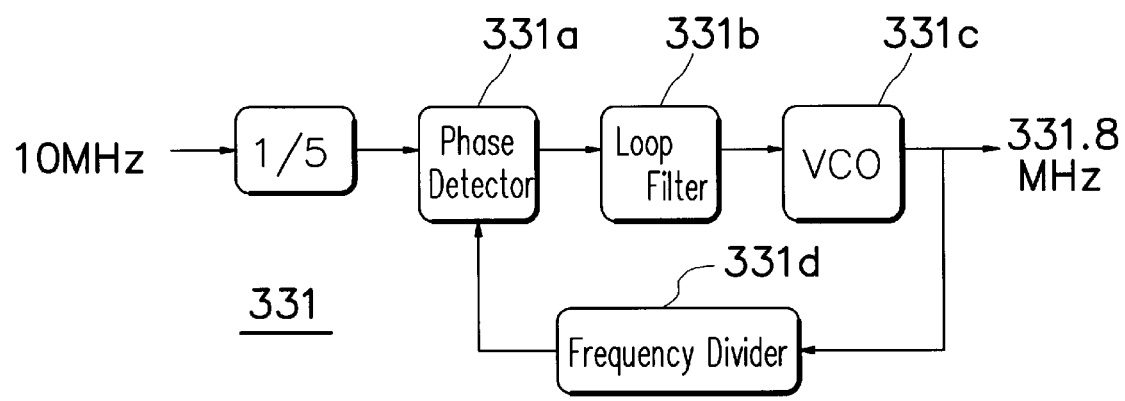

FIG. 4 is a circuit block diagram showing the frequency generator 331 of FIG. 2 with a phase-lock-loop structure. As shown in FIG. 4, a 10 MHz fundamental frequency signal is divided and then fed into a phase detector 331a. A 331.8 MHz frequency-fixed carrier signal is divided by a frequency divider 331d and then fed into the phase detector 331a. The phase detector 331a compares the divided signals and then generates a detecting signal to a loop filter 331b. The loop filter 331b filters the detecting signal and then outputs a DC voltage signal to a voltage-controlled oscillator 331c. The voltage-controlled oscillator 331c generates the frequency-fixed carrier signal according to the DC voltage signal.

In summary, since the transceiver of the invention adopts two different frequencies of receive intermediate frequency signal and transmit intermediate frequency signal, signal interference caused during receive/transmit switches can be efficiently prevented. Furthermore, the time for switching between receive and transmit is greatly reduced, increasing the efficiency of the transceiver because close loop modulation technique is adopted.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A transceiver with a receive/transmit fast switch function comprising:

a frequency generator for generating and outputting a carrier signal and a modulated carrier signal;

an intermediate frequency circuit for generating and outputting a transmit intermediate frequency signal and a receive intermediate frequency signal;

a transmitter electrically coupled to the frequency generator and the intermediate frequency circuit for receiving the modulated carrier signal and the transmit intermediate frequency signal, and up converting and outputting the modulated carrier signal;

a receiver electrically coupled to the frequency generator and the intermediate frequency circuit for receiving the carrier signal, the receive intermediate frequency signal and a receive signal, and down converting and outputting the receive signal.

2. The transceiver as claimed in claim 1, wherein the intermediate frequency circuit comprises:

a voltage-controlled oscillator for generating the first intermediate signal;

a mixer electrically coupled to the voltage-controlled oscillator for receiving the first intermediate frequency signal and generating the second intermediate frequency signal according to a frequency-fixed carrier;

a first frequency divider for receiving, dividing, and outputting a fundamental frequency signal;

a second frequency divider electrically coupled to the mixer for dividing and outputting the second intermediate frequency signal; and a phase detector electrically coupled to the first frequency divider and the second frequency divider for receiving and comparing the divided fundamental frequency and second intermediate frequency signals to each other, and then generating and outputting a detecting signal to the voltage-controlled oscillator thereby to cause the voltage-controlled oscillator to generate the first intermediate frequency signal according to the detecting signal.

3. The transceiver as claimed in claim 1, wherein the frequency generator comprises:

a first frequency divider for receiving, dividing, and outputting a fundamental frequency signal;

a second frequency divider for dividing and outputting the carrier signal;

a phase detector electrically coupled to the first frequency divider and the second frequency divider for comparing the divided fundamental frequency and carrier signals to each other thereby to output a detecting signal;

a loop filter electrically coupled to the phase detector for filtering and outputting the detecting signal; and a voltage-controlled oscillator electrically coupled to the loop filter for receiving the filtered detecting signal and outputting the modulated carrier signal according to a frequency phase shift signal and the filtered detecting signal.

4. The transceiver as claimed in claim 1, wherein the receiver comprises:

a signal amplifier for receiving, amplifying, and outputting the receive signal;

a first mixer electrically coupled to the signal amplifier and the intermediate frequency circuit for receiving the amplified receive signal, and down converting and outputting the amplified receive signal according to the second intermediate frequency signal; and a second mixer electrically coupled to the frequency generator and the first mixer for receiving the down converted receive signal, and down converting and outputting the receive signal according to the carrier signal.

5. The transceiver as claimed in claim 4, wherein the output signal of the second mixer has a frequency of approximately 110.6 MHz.

6. The transceiver as claimed in claim 4, wherein the output signal of the first mixer has a frequency of approximately 553 MHz.

7. The transceiver as claimed in claim 1, wherein the transmitter comprises:

a frequency multiplier electrically coupled to the frequency generator for multiplying and outputting the modulated carrier signal;

a mixer electrically coupled to the frequency multiplier and the intermediate frequency circuit for receiving the multiplied modulated carrier signal, and up converting and outputting the multiplied modulated carrier signal according to the first intermediate frequency signal; and a signal amplifier electrically coupled to the mixer for amplifying and outputting the up converted modulated carrier signal.

8. The transceiver as claimed in claim 7, wherein the frequency multiplier is used to receive the carrier signal with a frequency of approximately 442.4 MHz.

9. The transceiver as claimed in claim 7, wherein the frequency multiplier is used to generate the carrier signal with a frequency of 884.8 MHz.

10. The transceiver as claimed in claim 7, wherein the fundamental frequency signal has a frequency of approximately 10 MHz.

11. The transceiver as claimed in claim 1, wherein the first intermediate frequency signal and the second intermediate frequency signal are generated by the intermediate frequency circuit according to a frequency-fixed carrier signal.

12. The transceiver as claimed in claim 1, wherein the carrier signal is generated and modulated by the frequency generator according to a frequency phase shift signal corresponding to an output data signal.

13. The transceiver as claimed in claim 1, wherein the first intermediate frequency signal has a frequency ranging between 1,517.2 and 1,595.2 MHz.

14. The transceiver as claimed in claim 1, wherein the second intermediate frequency signal has a frequency ranging between 1,849 and 1,927 MHz.

15. The transceiver as claimed in claim 1, wherein the carrier signal has a frequency of approximately 442.4 MHz.

16. The transceiver as claimed in claim 1, wherein the carrier signal has a frequency of approximately 884.8 MHz.

* * * * *